United States Patent [19]

Muench

[11] 4,433,953
[45] Feb. 28, 1984

[54] INDUSTRIAL ROBOT HAVING A JOINT-FREE ARM

[75] Inventor: Nils L. Muench, Bloomfield Hills, Mich.

[73] Assignee: General Motors Corporation, Detroit, Mich.

[21] Appl. No.: 512,694

[22] Filed: Jul. 11, 1983

Related U.S. Application Data

[63] Continuation of Ser. No. 360,628, Mar. 22, 1982, abandoned.

[51] Int. Cl.³ ............................................... B66C 1/00
[52] U.S. Cl. ........................................ 414/735; 3/1.2; 101/44; 414/7; 414/680; 414/744 R
[58] Field of Search ............... 414/7, 680, 744 R, 735; 294/99 R; 271/103, 106; 198/955; 3/1.2, 12.6, 12.7; 101/44; 248/160

[56] References Cited

U.S. PATENT DOCUMENTS

| | | | |
|---|---|---|---|
| 2,065,473 | 12/1936 | Liwschutz | 40/412 |
| 3,090,049 | 5/1963 | Lanteigne | 3/1.2 X |
| 3,284,964 | 11/1966 | Saito | 414/7 X |
| 3,713,685 | 1/1973 | Ewing | 3/1.2 X |

*Primary Examiner*—Robert J. Spar
*Assistant Examiner*—Donald W. Underwood
*Attorney, Agent, or Firm*—Edward J. Biskup

[57] ABSTRACT

An industrial robot having an arm formed as a hollow joint-free tube which is oval in cross section and made from a material that will provide structural rigidity to enable the arm to support a work tool and provide controlled bending thereof when the hollow interior of the tube is subjected to a variation in pressure.

4 Claims, 6 Drawing Figures

INDUSTRIAL ROBOT HAVING A JOINT-FREE ARM

This application is a continuation, of application Ser. No. 360,628, filed Mar. 22, 1982, now abandoned.

This invention concerns industrial robots and, more particularly, an industrial robot having a work tool capable of being program-controlled for achieving movement about one or more axes to thereby perform work on a series of articles.

Commercially available industrial robots offer the promise of increased productivity and more uniform product control. At present, however, such industrial robots are expensive to purchase and maintain due primarily to the type of joints employed in the robot arm for realizing movement about a number of axes. As is known, each joint must be precision-machined and be powered in some manner which typically is by a light weight motor operating at high speed through proper gear ratios.

The present invention intends to alleviate the problem referred to above by providing a robot having an arm capable of joint-free movements. In one form, the robot made in accordance with the present invention is adapted to be positioned adjacent a conveyor for performing work on a series of moving articles; and comprises a curved hollow tubular arm designed to operate in accordance with the principles of operation of a Bourdon tube. The arm is made of a rigid material and preferably has an elliptical or oval cross-sectional configuration. One end of the tubular arm is sealed and carries a work tool, while the other end is supported by a base having a passage leading to the hollow interior of the tubular arm. A source of pressurized hydraulic fluid is connected to the passage in the base, and a valve is provided for selectively and alternately connecting the hollow interior of the tubular arm with the source of pressurized fluid and with atmosphere. As a result, the sealed end of the tubular arm moves about an axis towards longitudinal alignment with its supported end when the hollow interior of the tubular arm is pressurized and back to its original position when connected to atmosphere. During such movement the work tool contacts the articles successively and performs work thereon.

In a second form of the present invention, a pair of the curved hollow tubular arms are interconnected and positioned in planes which are perpendicular to each other. Each tubular arm operates in the manner of a Bourdon tube so when the pair of tubular arms are connected with the source of pressurized hydraulic fluid, the work tool moves about a pair of mutually perpendicular axes. In a third form of the present invention, the hollow tubular arm is arranged in a coiled fashion so as to form a cylindrical spiral, and when connected with the pressurized hydraulic fluid, will tend to unwind and thus rotate the work tool.

The objects of the present invention are: to provide a new and improved industrial robot having a joint-free tubular arm which supports a work tool at one end thereof and is normally curved in configuration but tends to straighten to cause movement of the work tool when the hollow interior of the arm is supplied with pressurized hydraulic fluid; to provide a new and improved joint-free arm for an industrial robot having a pair of interconnected curved tubular arms which cause movement of a work tool in two planes at right angles to each other when the hollow interiors of the tubular arms are connected with a source of pressurized hydraulic fluid; to provide a new and improved joint-free arm for an industrial robot that has a hollow tubular arm formed as a cylindrical spiral and supporting a work tool at one end that moves in a circular path when the interior of the tubular arm is supplied with pressurized hydraulic fluid; to provide a new and improved industrial robot having a hollow joint-free curved arm which is elliptical in cross-sectional configuration and made from material that will provide structural rigidity so as to enable the arm to support a work tool and provide controlled bending movement thereof when the hollow interior of the arm is subjected to variation in pressure.

The above and other objects and advantages of the present invention will be apparent from the following detailed description taken in conjunction with the drawings, in which.

Figure 1:
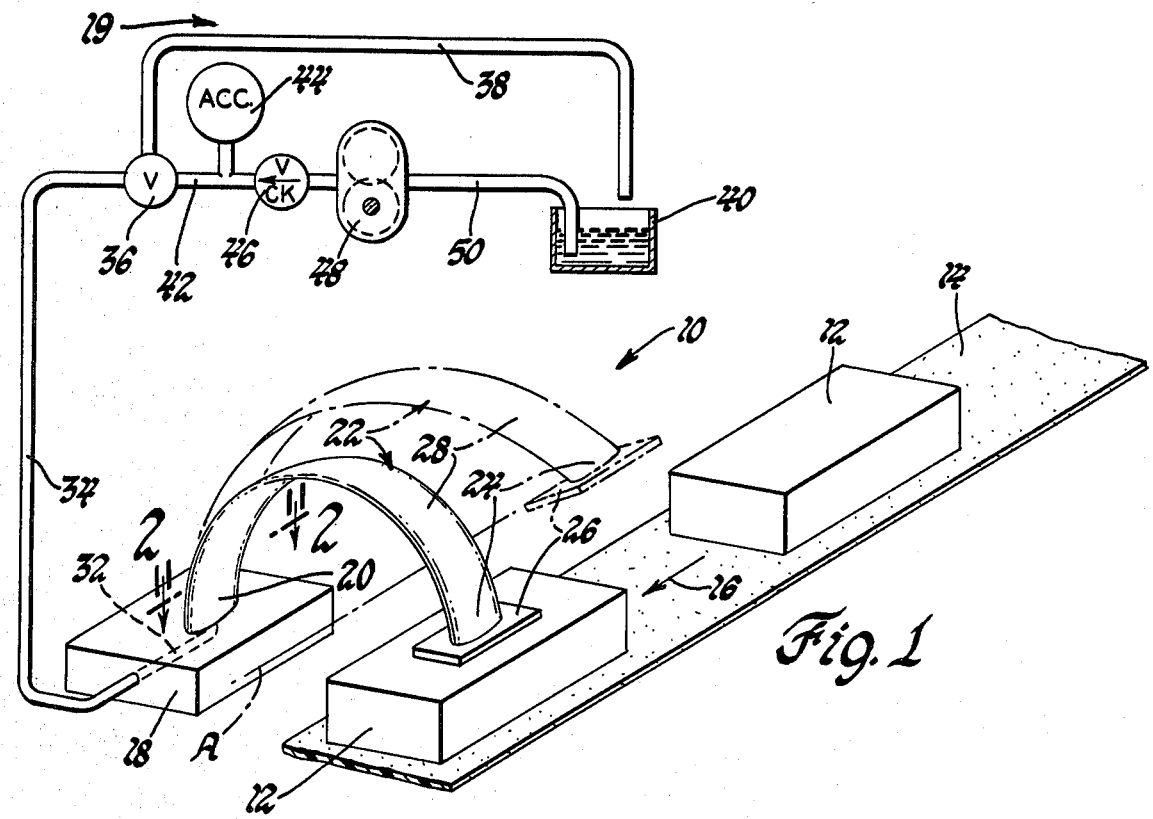
FIG. 1 is a perspective view showing one form of an industrial robot made in accordance with the present invention.
Figure 2:
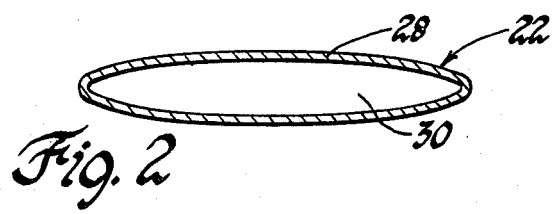
FIG. 2 is an enlarged cross-sectional view taken on line 2—2 of the arm incorporated with the industrial robot shown in FIG. 1, and shows the hollow interior thereof.

Referring to the drawings and more particularly to FIGS. 1 and 2 thereof, an industrial robot 10 is shown which is suitable for controlled movement to achieve work-processing relationship with respect to parts, such as the containers 12 supported by a conveyor belt 14 moving in the direction of the arrow 16. In general, the robot 10 comprises a base 18 located alongside the conveyor belt 14 and connected to a hydraulic system 19 to be hereinafter described. The base 18 fixedly supports one end 20 of an arm 22, the free end 24 of which supports a work tool 26. In this case, the work tool 26 takes the form of a labeler or stamper capable of imprinting an identifying indicia on each of the containers 12 moving past the robot 10.

The arm 22 takes the form of a thinwall tube or tubular member 28 which can be made of metal or plastic material and, as seen in FIG. 2, is preferably oval or elliptical in cross section. The tube 28 is designed to operate in accordance with the principles of operation of a Bourdon tube and therefore has a curved configuration. The normal curved configuration of the tube 28 is seen in full lines in FIG. 1, but as will be more fully described hereinafter, when the hollow interior 30 of the tube 28 is supplied with pressurized hydraulic fluid, the free end 24 thereof will move relative to the other end 20 to the phantom-line position.

More specifically, the free end 24 of the tube 28 is sealed while the other end 20 is supported by and rigidly connected to the base 18 in a manner which allows the hollow interior 30 of the tube 28 to communicate with a passage 32 in the base 18 which leads to the hydraulic system 19. In this regard, the passage 32 is connected by a conduit 34 to a two-position, three-way valve 36 which has one port thereof connected by a conduit 38 to a vented reservoir 30 containing hydraulic fluid. The other port of the valve 36 is connected by a conduit 42 to an accumulator 44 which is connected via a check valve 46 to a pump 48 which draws hydraulic fluid from the reservoir 40 through the conduit 50. The pump 48 serves to charge the accumulator 44 to a predetermined pressure which is sufficient to cause straightening of of the tube 28 when introduced to the hollow interior thereof.

Thus, when the valve 36 is in one position, the hollow interior 30 of the tube 28 is connected (via the valve 36 and conduit 38) to atmosphere, and the arm 22 assumes the normal full-line curved position shown in FIG. 1 wherein the work tool 26 is pressed into surface contact with a container 12 to place the identifying marking thereon. On the other hand, when the valve 36 is moved to the other of the two positions, the hollow interior 30 of the tube 28 is connected to the accumulator 44 to thereby cause pressurized hydraulic fluid to flow through the conduit 34 and passage 32 in the base 18 into the hollow interior 30 of the tube 28. As mentioned above, inasmuch as the tube 28 is designed to operate in accordance with the principles of operation of a Bourdon tube, when the hollow interior 30 thereof is connected to the source of pressurized hydraulic fluid, the arm 22 will tend to straighten and cause the work tool 26 to be raised about the horizontal axis A, from the full-line normal position to the raised position shown in phantom lines. The arm 22 will maintain the phantom-line position of FIG. 1 until the next container 12 is located adjacent the robot 10—at which time the valve 36 will be shifted to the first position to connect the hollow interior 30 of the tube 28 to atmosphere and cause the work tool 26 to make contact with a container 12.

It should be apparent that movement of the valve 36 between the two positions so that the work tool 26 moves into and out of contact with a container 12, as well as controlled travel of the conveyor belt 14 so that it stops and starts for proper positioning of each container 12 in relation to the robot 10, can be done manually. However, as is well known to those skilled in the art, a suitable control system with limit switches, sensors, and the like can be provided for automatically controlling the operation of the robot 10 and conveyor belt 14.

Figure 3:
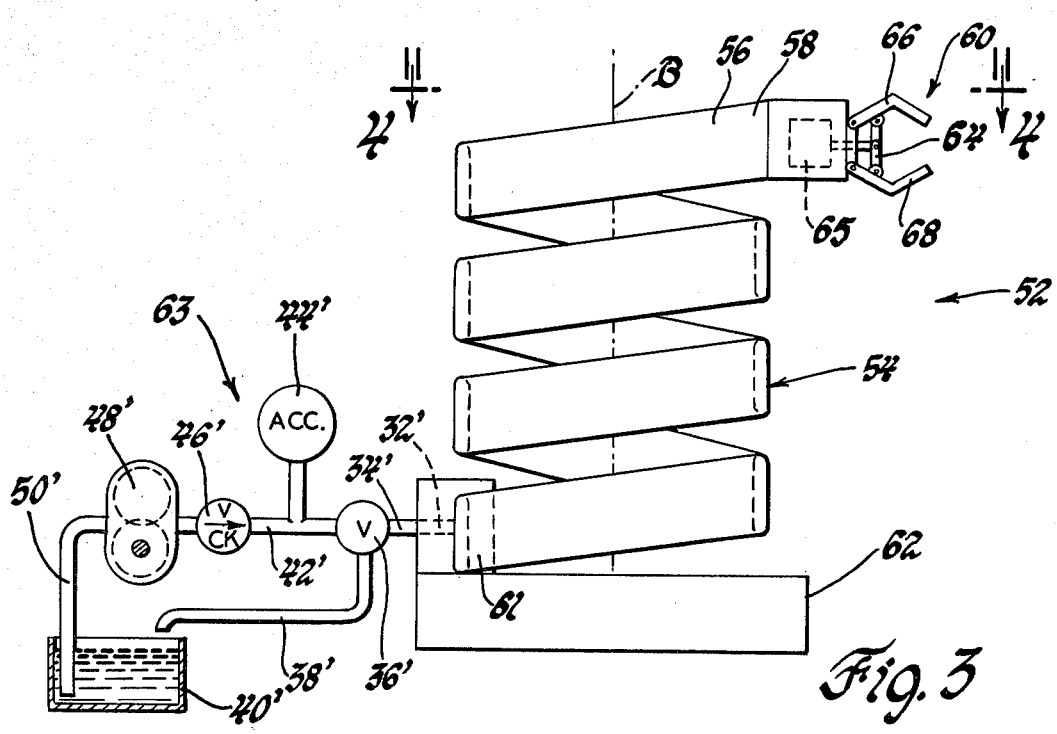
FIG. 3 is an elevational view showing a modified form of the industrial robot shown in FIG. 1.
Figure 4:
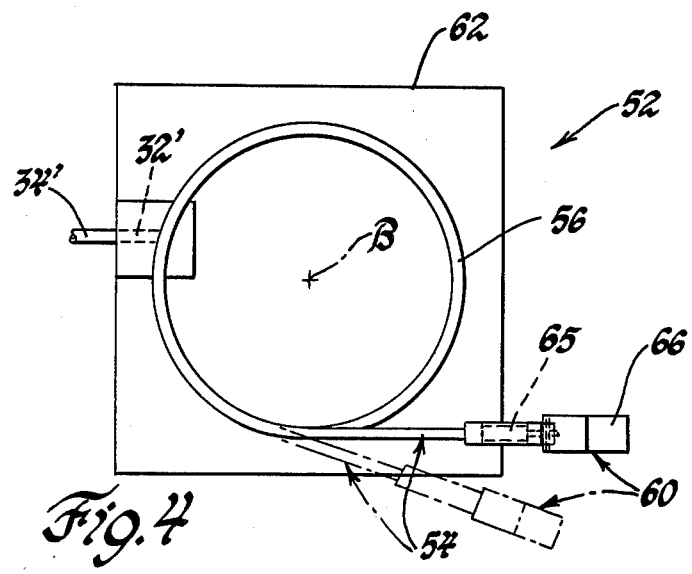
FIG. 4 is a plan view of the industrial robot shown in FIG. 3 taken on line 4—4 thereof.

FIGS. 3 and 4 show an industrial robot 52 that is generally similar in structure and function to the robot 10 shown in FIG. 1, except that the arm 54 thereof is modified so as to provide rotational movement of its work tool 60 about a vertical axis B. In this instance, the arm 54 also takes the form of a hollow tubular member 56 which in cross section is generally elliptical in configuration, and is designed to operate in accordance with the principles of operation of a Bourdon tube. The arm 54, however, differs structurally from the arm 22 of robot 10 primarily in that it is formed as a helix or cylindrical spiral. The uppermost end 58 of the arm 54 is sealed and supports a work tool 60, while the lower end 61 of the arm is rigidly connected to a base 62 which, in turn, is operatively connected to a hydraulic system 63 providing a source of pressurized hydraulic fluid. Both the base 62 and hydraulic system 63 are essentially the same in construction and operation as the base 18 and system 19 associated with the robot 10 of FIG. 1. Accordingly, the parts of the base 62 and hydraulic system 63 that are identical to the corresponding parts shown in FIG. 1 are identified by the same reference numerals but primed.

The work tool 60 takes the form of a fingered gripper connected by linkage 64 to an air motor 65 or the like which, when pressurized, causes the opposed pivoted fingers 66 and 68 of the tool 60 to move toward each other and thereby grasp or seize an article (not shown). When the air motor is connected to atmosphere, a spring (not shown) incorporated in the air motor 65 will cause the fingers 66 and 68 to return to the full-line position shown and thereby release the article. Grippers of this type are well known in the art and therefore a further discussion thereof is not deemed necessary.

The operation of the robot 52 of FIGS. 3 and 4 is similar to the operation of the robot 10 of FIG. 1: movement of the valve 36' to one position causes the pressurized hydraulic fluid to flow—via conduit 34' and passage 32', to the hollow interior of the arm 54. As a result the work tool 60 will rotate about the vertical axis B from the full-line position to the phantom-line position (as seen in FIG. 4), at which time the work tool 60, when activated by the air motor 65, can grasp an article and move it from one location to another. When the valve 36' is moved to its second position, the hollow interior of the arm 54 is connected to atmosphere via the conduit 38' so that the work tool 60 moves from the phantom-line position to the full-line normal position of FIG. 4. The sequence of movement as described can then be repeated.

Figure 5:
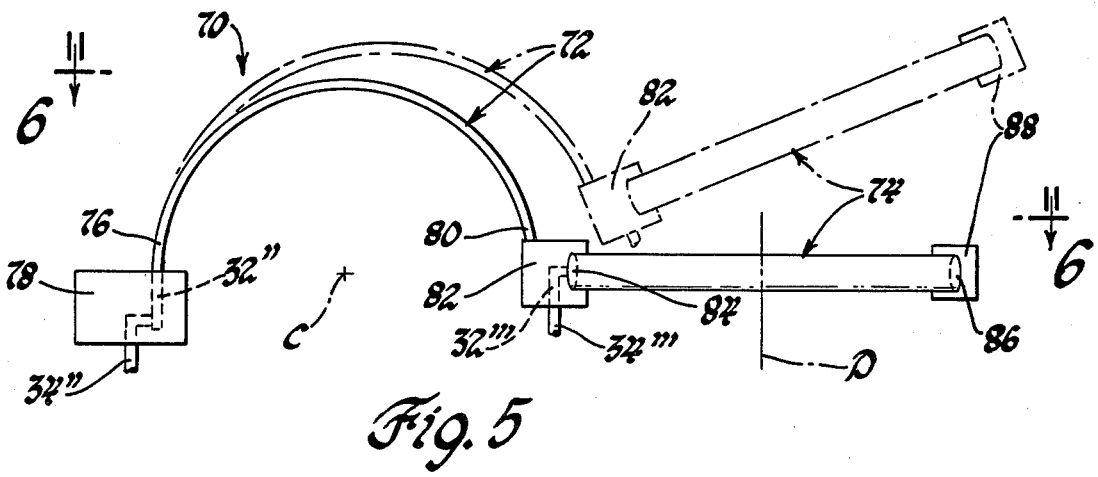
FIG. 5 is a side elevational view of another form of the industrial robot shown in FIG. 1.
Figure 6:
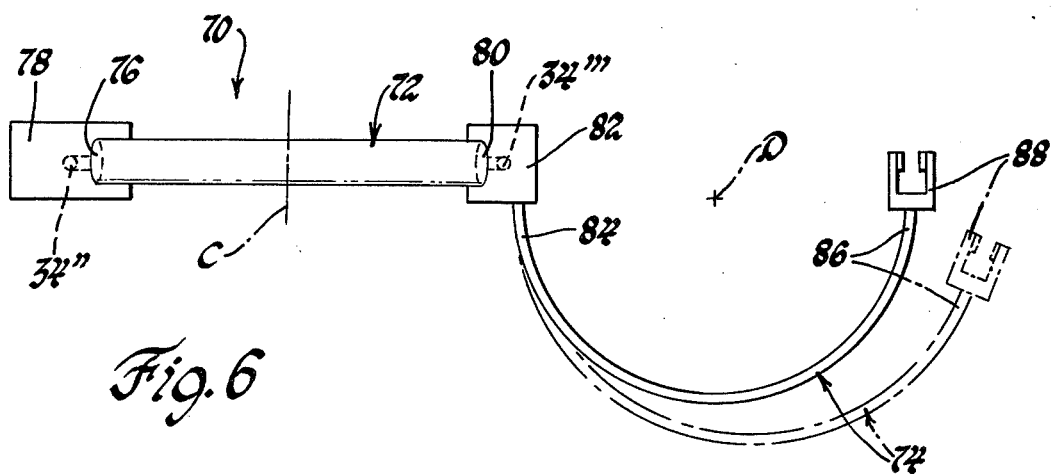
FIG. 6 is a plan view of the industrial robot shown in FIG. 5 and taken on line 6—6 thereof.

FIGS. 5 and 6 show another form of an industrial robot according to the present invention and in this case is identified by the reference numeral 70. The robot 70 includes a pair of interconnected arms 72 and 74 each of which is formed as a curved tubular member which is essentially identical in construction to the tube 28 of the robot 10 of FIGS. 1 and 2. The arm 72 has one end 76 rigidly supported by a base 78 which is connected by a conduit 34" and via a passage 32" to a hydraulic system (not shown), identical to the hydraulic system 19 connected to robot 10 of FIG. 1. The other end 80 of the arm 72 is sealed and is rigidly connected to a block member 82 which serves as a support for the one end 84 of the arm 74 which is located in a plane perpendicular to the plane of the arm 72. The sealed end 86 of the arm 74 is connected to and supports a work tool 88 which takes the form of a gripper, such as the work tool 60 incorporated with the robot 52 of FIGS. 3 and 4. Also, the block member 82 is formed with a passage 32'" which is connected to the hollow interior of the arms 74, as a conduit 34'" which leads to a separate hydraulic system identical to the hydraulic system connected to the base 78. Thus, by operating the valve of the hydraulic system connected to the base 78 between its two positions, the arm 72 will move about a horizontal axis C between its normal full-line position and the phantom-line position of FIG. 5 and causes the arm 74 to be displaced as shown therein. Similarly, movement of the valve of the hydraulic system connected to the block member 82 will cause the arm 74 to move about the vertical axis D between the normal full-line position and the phantom-line position of FIG. 6. In this manner, the work tool 88 can be moved about a pair of mutually perpendicular axis C and D.

Another form of the industrial robot (not shown), made in accordance with the present invention, combines the cylindrical spiral form of the arm 54 of FIGS. 3 and 4 with the two interconnected curved arms 72 and 74 of FIGS. 5 and 6 so as to provide a robot having a work tool that is capable of movement about three axes. In such case, each arm would be connected to an independent hydraulic system so that the various arms would be selectively movable in response to proper positioning of the associated valve. As should be apparent, other combinations can be made utilizing the cylindrical spiral form of the arm of FIGS. 3 and 4, with one or more of the curved arms of FIGS. 1 and 2 to obtain robots having movement about multi-axes.

Various modifications and changes can be made in this construction without departing from the spirit of the invention. Such modifications and changes are contemplated by the inventor, and he does not wish to be limited except by the scope of the appended claims.

The embodiments of the invention for which an exclusive property or privilege is claimed are defined as follows:

1. A robot adapted to be positioned adjacent a support table for performing work on a series of articles, said robot comprising a base rigidly supporting an arm that includes a generally circular tubular member sealed at its free end and having an opening at its supported end that communicates with the hollow interior of said tubular member, said tubular member being made of a rigid material and having a uniform cross-sectional configuration; a hydraulic system including a source of pressurized hydraulic fluid connected to said opening at said supported end of said tubular member; a work tool attached to said free end of said tubular member; and valve means between said source of pressurized hydraulic fluid and said opening at said supported end of said tubular member, said valve means having a first position wherein said source of pressurized hydraulic fluid is connected to said opening so as to cause said free end of said tubular member to move towards longitudinal alignment with said supported end, and having a second position for connecting said opening to atmosphere so as to cause said tubular member to return said free end to its original position; said work tool adapted to move towards and away from said series of articles successively and perform work thereon as said valve means is moved between said first position and said second position.

2. A robot adapted to be positioned adjacent a support table for performing work on a series of articles, said robot comprising a base rigidly supporting an arm that includes a tubular member formed as a cylindrical spiral, said tubular member being sealed at its free end and having an opening at its supported end that communicates with the hollow interior of said tubular member, said tubular member being made of a rigid material and having a uniform elliptical cross-sectional configuration; a hydraulic system including a source of pressurized hydraulic fluid connected to said opening at said supported end of said tubular member; a work tool attached to said free end of said tubular member; and valve means between said source of pressurized hydraulic fluid and said opening at said supported end of said tubular member, said valve means having a first position wherein said source of pressurized hydraulic fluid is connected to said opening so as to cause said free end of said tubular member to rotate about the longitudinal center axis of said cylindrical spiral, and having a second position for connecting said opening to atmosphere so as to cause said tubular member to return said free end to its original position and thereby allow said work tool to move towards and away from said series of articles successively and perform work thereon.

3. A robot adapted to be positioned adjacent a support table for performing work on a series of articles, said robot comprising a base rigidly supporting an arm that includes a pair of curved tubular members interconnected by a block member so as to locate one of said pair of tubular members in a plane perpendicular to the plane of the other of said tubular members, one end of each of said pair of tubular members being sealed and having an opening at its supported end that communicates with the hollow interior of each of said tubular members, each of said tubular members being made of a rigid material and having a uniform cross-sectional configuration; a hydraulic system including a source of pressurized hydraulic fluid connected to said opening at said supported end of each of said tubular members; a work tool attached to the free end of said arm; and valve means between said source of pressurized hydraulic fluid and said opening at each of said supported ends of said pair of tubular members, said valve means having a first position wherein said source of pressurized fluid is connected to said opening at each of said supported ends so as to cause said sealed end of each of said tubular members to move towards longitudinal alignment with its supported end, and having a second position for connecting said opening at each of said supported ends to atmosphere so as to cause said sealed end of each of said tubular members to return to its original position and thereby allow said work tool to move about a pair of substantially perpendicular axes towards and away from said series of articles successively and perform work thereon.

4. A robot adapted to be positioned adjacent a support table for performing work on a series of articles, said robot comprising a base rigidly supporting an arm that includes a tubular member of generally circular configuration that is sealed at its free end and has an opening at its supported end that communicates with the hollow interior of said tubular member, said tubular member being made of a rigid material so as to normally maintain said circular configuration and having an elliptical cross-sectional configuration; a hydraulic system including a source of pressurized hydraulic fluid connected to said opening at said supported end of said tubular member; a work tool attached to said free end of said tubular member; and valve means between said source of pressurized hydraulic fluid and said opening at said supported end of said tubular member, said valve means having a first position wherein said source of pressurized hydraulic fluid is connected to said opening so as to cause said free end of said tubular member to move towards longitudinal alignment with said supported end in the manner of a Bourden tube, and having a second position for connecting said opening to atmosphere so as to cause said tubular member to return said free end to its original position; said work tool adapted to move towards and away from said series of articles successively and perform work thereon as said valve means is moved between said first position and said second position.

* * * * *